United States Patent [19]
Osuchowski et al.

[11] 3,930,667
[45] Jan. 6, 1976

[54] INFLATABLE GARMENT FOR CRASH PROTECTION

[76] Inventors: Andrew J. Osuchowski, 19396 Sherwood Ave., Detroit, Mich. 48234; Robert S. Lulenski, 29334 Campbell Drive, Warren, Mich. 48093

[22] Filed: Feb. 14, 1975

[21] Appl. No.: 550,153

[52] U.S. Cl. ............ 280/150 AB; 9/330; 2/DIG. 3; 280/290
[51] Int. Cl.² .......................................... B60R 21/00
[58] Field of Search ..... 244/122 R, 122 AG, 122 B, 244/143; 9/11 A, 330, 341; 2/DIG. 3; 297/384; 280/150 AB, 150 B, 150 SB, 290

[56] References Cited
UNITED STATES PATENTS

| | | | |
|---|---|---|---|
| 1,640,270 | 8/1927 | Furman | 244/143 |
| 1,771,727 | 7/1930 | Braun | 244/122 R |
| 2,316,101 | 4/1943 | Norred | 9/341 X |
| 3,243,822 | 4/1966 | Lipkin | 280/150 AB X |
| 3,392,405 | 7/1968 | Ritzinger | 9/330 X |
| 3,441,963 | 5/1969 | Steinthal | 9/341 X |
| 3,827,716 | 8/1974 | Vaughn | 280/150 AB |

*Primary Examiner*—Philip Goodman
*Assistant Examiner*—Terrance L. Siemens
*Attorney, Agent, or Firm*—Jay C. Taylor

[57] ABSTRACT

An inflatable garment or suit of clothing worn by a motorcycle rider is detachably connected with a source of pressurized gas operative to inflate the suit in response to a predetermined deceleration of the motorcycle, or manual operation of a trigger adjacent the motorcycle hand grip when a crash or spill appears to be inevitable. If the rider jumps or is thrown from the motorcycle, the suit will pull loose from the gas source by virtue of the detachable connection and will remain inflated for an appreciable time interval to protect the rider from multiple impacts. The detachable connection is also manually operative to permit the rider to disengage the suit in its non-inflated condition from the gas source without triggering the latter, and thereby to leave the motorcycle while still wearing the suit.

10 Claims, 5 Drawing Figures

U.S. Patent   Jan. 6, 1976   3,930,667
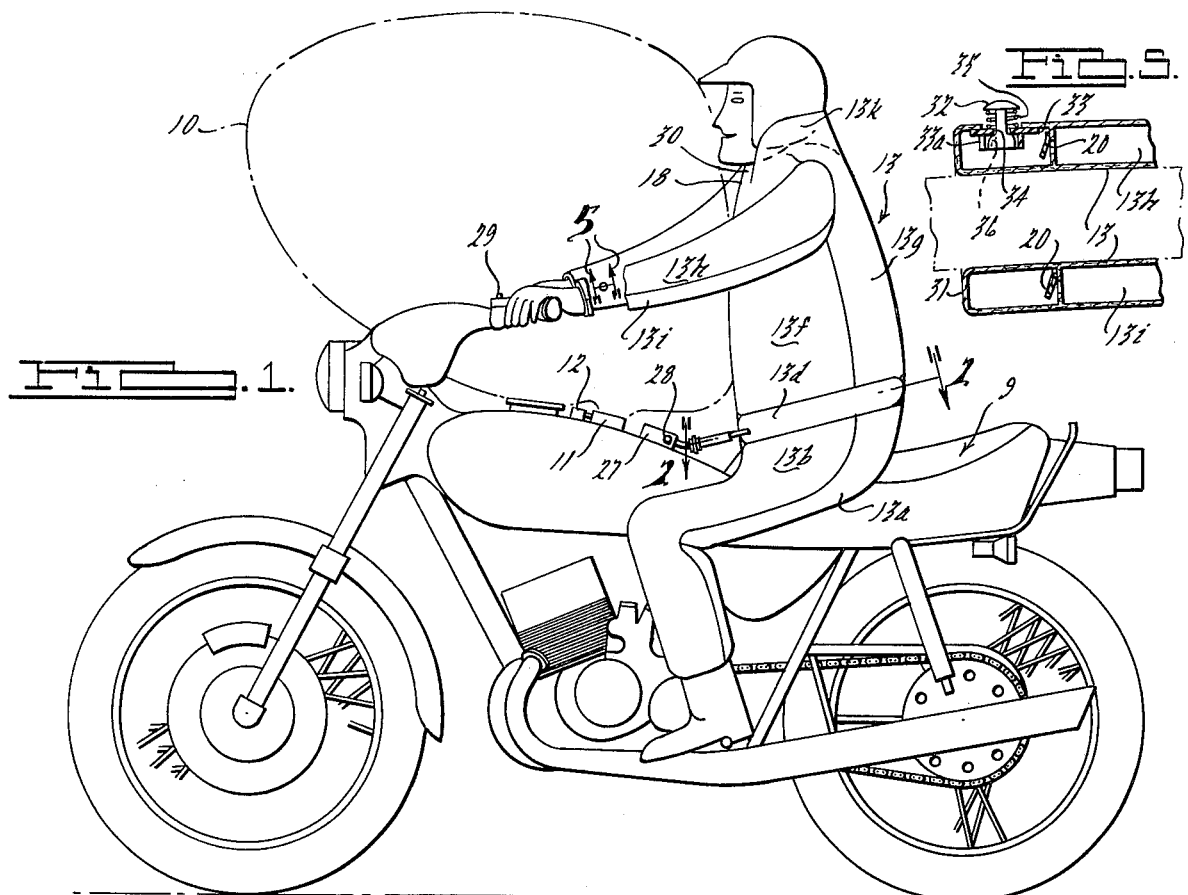
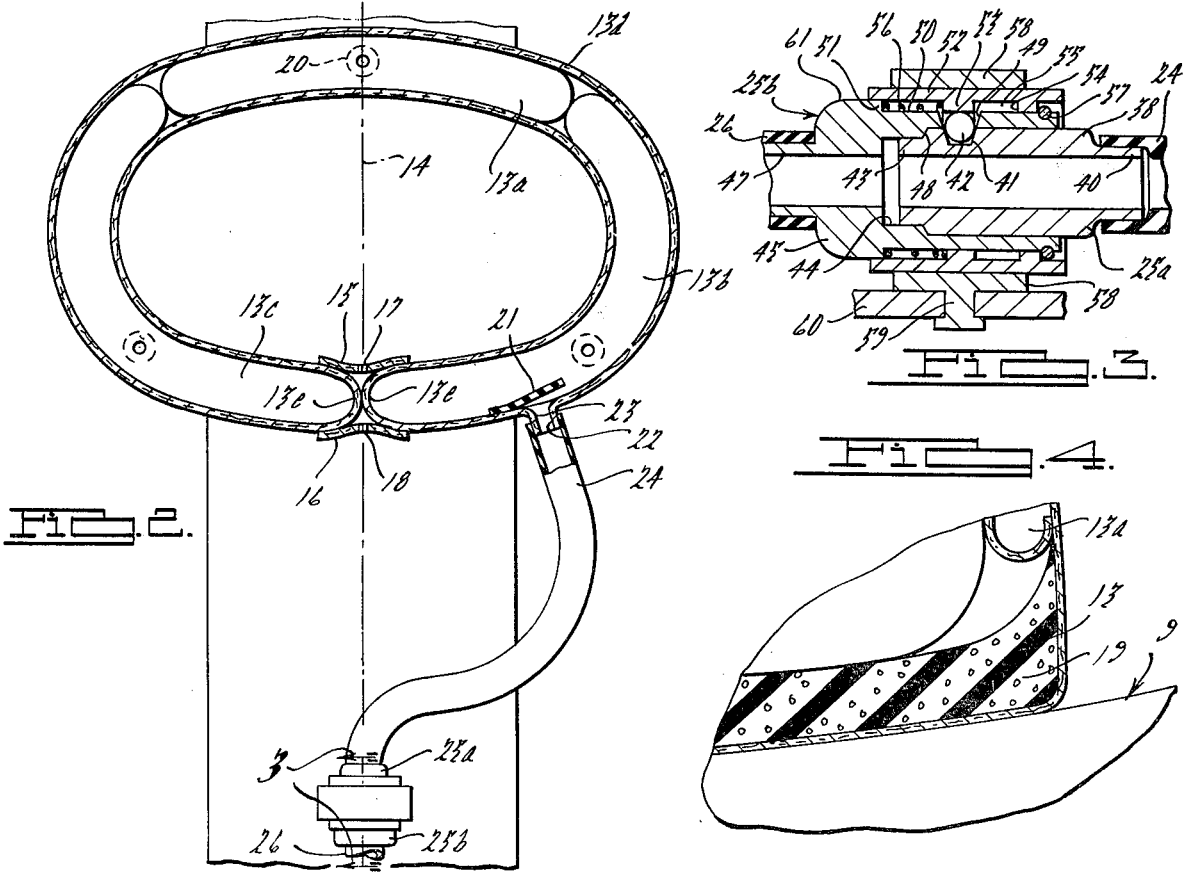

INFLATABLE GARMENT FOR CRASH PROTECTION

BACKGROUND AND OBJECTS OF THE INVENTION

This invention relates to improvements in a crash protection device for a person who might jump or be thrown from a moving vehicle, and in particular to such a device comprising an inflatable garment or suit adapted to be worn by a motorcycle rider or a rider on a snowmobile or speed boat or the like where the vehicle itself affords scant protection to the rider in the event of a crash or collision and where multiple impacts might be suffered by the rider subsequent to the initial crash.

Inflatable devices such as inflatable bags, often called air bags, or inflatable belts and jackets to provide buoyancy after a marine accident, that are inflated either automatically or by manual actuation of inflation means in the event of a crash have been proposed to protect people in automobiles, boats, and other vehicles. Where such devices are proposed for crash protection, they are designed to protect the rider while in the vehicle, not in the event he jumps or is thrown from it. Typical examples of such inflatable devices known to the art are illustrated in the U.S. Pat. Nos. to Lipkin 3,243,822, and Henderson 3,146,460, but such devices are not intended for and are not particularly useful for protecting exposed motorcycle or snowmobile riders or the like.

An adequate inflatable crash protection device for a motorcycle rider for example must satisfy a number of conditions entirely different from those desired for automobile crash protection. In the latter situation, an air bag for example provided for first crash protection will inflate almost immediately at the first crash of predetermined magnitude and will then deflate within a fraction of a second. It is not intended to afford protection for a second or subsequent multiple crashes and is thus caused to deflate shortly after the first crash to enable the driver to regain visibility and control over the vehicle, and also to minimize a dangerous rebound from the inflated air bag and to prevent the driver or occupant from being trapped in the vehicle after an accident. The "first crash" protection afforded by an air bag has also been proposed for use by motorcyclists, wherein an inflatable air bag carried by the motorcycle is caused to inflate directly in front of the rider to cushion his forward movement in the event the motorcycle strikes a barrier with a predetermined force. Although such a device will be effective in some instances, a motorcycle seldom strikes a barrier head on. The cyclist usually attempts to avoid the crash and a glancing crash will result, so that the air bag arranged as described above will seldom afford adequate protection.

Also, although it is a rarity for an automobile driver or passenger to be thrown from the car in the event of a crash, the reverse is true for the motorcyclist who almost invariably jumps or is thrown from the motorcycle in the event of a crash of sufficient magnitude to trigger the inflation device.

Furthermore, a motorcyclist will usually anticipate a crash in considerable time before it takes place. In many instances he can take evasive action to reduce his speed or to minimize the crash. Frequently he will elect to jump clear of the motorcycle just before the crash. Accordingly trigger means for manually actuating the inflation device should be immediately available to the rider and "second crash" protection over a sustained time interval is of utmost importance because the actual crash might occur several seconds after the danger first becomes apparent and the inflation device is triggered manually.

It is accordingly an important object of this invention to provide improvements in a crash protection device comprising an inflatable suit adapted to be worn by exposed riders of such vehicles as motorcycles, snowmobiles, and boats having a suitable source of pressurized gas adapted to be triggered in anticipation of an accident exceeding a predetermined magnitude. The suit is provided with a detachable coupling member connectible with a pivotal coupling member pivotally mounted on the vehicle and connected in turn with the gas source. Conventional trigger means responsive to predetermined deceleration of the vehicle and also to manual actuation by the rider will actuate the gas source to cause almost immediate inflation of the suit. In the event the rider thereafter jumps or is thrown in any direction from the vehicle, his weight will swing the pivotal coupling member in accordance with his direction of movement with respect to the vehicle and pull the detachable coupling member free from the inflation means and the vehicle. A check valve prevents immediate deflation of the suit after its disengagement from the inflation means, whereby the inflated suit protects the rider from the second and possible multiple subsequent crashes over a time interval amounting to many seconds.

Other objects are to provide such a device wherein the inflatable suit may be readily worn in its deflated condition as a protective garment to protect against wind, mud, and flying stones, and wherein the rider may readily disengage himself from the vehicle and gas source without removing the inflatable suit.

Another object is to provide a protection device of the above character which provides for deflation of the suit after an extended time, either by slow leakage through the fabric of the suit or bleed ports, or by manually actuatable valves under the control of the rider.

Another object is to provide such a crash protection device comprising an inflatable suit that is provided with a padded seat or buttocks portion that is not otherwise inflatable when the suit is inflated, thereby to provide protection for the rider's buttocks without causing him to be forced from the vehicle seat when the suit is rapidly inflated in an emergency.

Another object is to provide a manually actuatable trigger particularly adapted for use by a motorcyclist for actuating the inflation means or gas source, the trigger being arranged at an improved location on the motorcycle handlebar adjacent the handgrip and immediately accessible to the cyclist in the event of an emergency.

Other objects of this invention will appear in the following description and appended claims, reference being had to the accompanying drawings forming a part of the specification wherein like reference characters designate corresponding parts in the several views.

BRIEF DESCRIPTION OF THE DRAWINGS

FIG. 1 is a side elevational view of a motorcycle with rider wearing an inflatable suit embodying the present invention, the suit being shown in its inflated condition.

FIG. 2 is a generally horizontal enlarged section through the central inflatable header of the suit, taken in the direction of the arrows substantially along the line 2—2 of FIG. 1.

FIG. 3 is a sectional view taken in the direction of the arrows substantially along the line 3—3 of FIG. 2, showing a detachable swivel connection with the motorcycle.

FIG. 4 is a vertical mid-sectional view showing the padded seat of the inflatable suit.

FIG. 5 is a sectional view longitudinally of the wrist, taken in the direction of the arrows substantially along the line 5—5 of FIG. 1, showing a deflation valve.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF THE PREFERRED EMBODIMENT

Referring to the drawings, an embodiment of the present invention is illustrated by way of example with a motorcycle 9 which may or may not be provided with a conventional inflatable air bag 10 illustrated in phantom in its inflated condition for cushioning the forward movement of the rider in the event of rapid deceleration of the motorcycle. The bag 10 is normally contained in a collapsed condition within a small container 11 secured to the motorcycle and is inflated almost instantly by gas from an explosive charge 12 in response to a predetermined impact or deceleration of the motorcycle, all in a conventional manner and forming no part of the present invention.

The present invention comprises an inflatable double wall suit 13 adapted to be worn in a deflated condition over the normal clothing of the cyclist as a protective outer garment that may have the appearance of conventional cover-alls which extend from the ankles to the wrists and completely cover the body except for the head, hands, and feet. The latter are conventionally protected by a helmet, gloves, and boots, as shown. The suit 13 preferably zippers at the sides or front to facilitate its donning and removal and serves in its uninflated condition as a wind break and as a protection against mud and flying stones that are frequently thrown by passing automobiles.

As illustrated in FIG. 2, the body of the suit 13 may comprise several separately inflatable double wall gas containing sections 13a, 13b, and 13c that extend downward from a central inflatable header 13d of the suit 13. In the present instance, the header 13d extends entirely around the body of the cyclist proximate the belt line and is preferably provided with separable paired end walls 13e at opposite sides of the saggital mid-plane 14 and secured to inner and outer flexible fabric flaps 15 and 16 respectively. The latter are also separable along the mid-plane 14, the two separable mid-plane edges of the inner flap 15 being releasably secured together by suitable means, such as an inner zipper 17 of conventional construction. Similarly the separable mid-plane edges of the outer flap 16 are releasably secured together by an outer zipper 18.

Also in the present instance, the section 13a extends from the header 13d to adjacent the seat or buttocks region 19 of the suit 13 which is padded with a suitable shock absorbing material and is not inflatable, thereby to protect the seat of the rider in the event he is thrown from the motorcycle, but not to cause him to be inadvertently raised from the seat of the motorcycle when the suit 13 is inflated as described below. The section 13a bifurcates laterally around the padded seat 19 and extends along the rear portions of the legs to the boots.

The sections 13b and 13c in the present instance extend from the header 13d along the front of the body and legs to the boots. The sections 13a, 13b, and 13c are in communication with the header 13d to receive pressurized gas therefrom via one-way check valves 20, FIG. 2, one for each lower section 13a, 13b, and 13c, whereby the aforesaid lower sections of the suit 13 may be inflated upon inflation of the header 13d, but in the event of a rupture of any one section after inflation, the entire suit 13 will not be deflated.

The valves 20 may be conventional and similar in structure to the primary gas inlet valve 21, FIG. 2, or the pressure relief valve 32, FIG. 5. The valve 21 comprises a flexible valve flap bonded or otherwise secured at a number of spaced locations to the inner annular base flange of a hard plastic nipple 22 which defines a gas inlet port 23. The flap valve 21 has sufficient rigidity to withstand the internal pressure of the inflated suit 13, but yields to enable inflation of the header 13d from an external source of pressurized gas. When the external gas pressure is removed, the internal pressure of the suit 13 forces the valve 21 against the aforesaid base flange of nipple 22 to a closed position to prevent deflation of the suit 13 via inlet port 23.

The annular base flange of the nipple 22 is also bonded to the flexible material of the suit 13. Outwardly, the nipple 22 is secured or bonded to one end of a short flexible gas supply hose 24 having its other end secured to a coupling 25a adapted to be detachably secured at a fluid tight seal to a mating coupling 25b. The latter in turn is connected by a hose 26 to a suitable source of pressurized gas 27, which may be similar to the gas source 12 or may comprise a tank of compressed air, adapted to be released into hose 26 (and thus via coupling 25a, b into hose 24, inlet port 23 and header 13d) in response to a predetermined deceleration of the motorcycle or a barrier impact against its front end. A pressure relief valve 28 associated with the gas source 27 prevents excess inflation of the suit 13.

The trigger mechanism for releasing gas from the source 27 may also be conventional, as for example of the type in use for inflating the conventional air bag 10. In addition a manually operated trigger button 29 is operatively connected with the gas source 27 to actuate the latter to discharge its gas into hose 26. The button 29 is mounted on the handle bar of the motorcycle adjacent one of the hand grips, whereby the cyclist may depress the button 29 with his thumb in anticipation of a crash and cause inflation of the suit 13 in a fraction of a second, i.e., within the time required for the motorcycle to travel approximately a foot or two at about 30 miles per hour, and jump clear of the cycle to avoid being injured by its engine or spinning wheels.

The upper portion of the suit 13 may also comprise several separately inflatable double wall sections 13f and 13g in communication with the header 13d by one-way check valves similar to the valves 20. The sections 13f and 13g are similar to the above described lower sections 13a, b, c and extend along the left front and side and along the left rear and side respectively of the suit 13 from the header 13d to the neck 30. The latter may be padded or not in the manner of the seat 19, but is not inflatable. Thus choking of the cyclist is avoided upon inflation. Inflatable sections similar to the sections 13f and 13g are also provided at the right side of the suit 13. Likewise inflatable arm sections 13h and 13i extend above and below each arm from the corresponding rear section 13g and may communicate therewith via one-way valves similar to the valves 20 for the reasons specified above. Preferably an inflatable collar section 13k of the suit 13 is connected with the rear sections 13g by valves similar to the valves 20 and extends in the inflated position around the lower sides and back portions of the head and neck 30 as shown.

The specific arrangement and number of the separately inflatable sections of the suit 13 and the gas flow pathways may be varied considerable for particular conditions. Preferably the spacing between the inner and outer walls of the double wall sections for the arms and legs will be less than the corresponding spacing for the body portions of the suit in order to facilitate limited movement of the arms and legs of the rider when the suit is inflated.

Adjacent the extremities of each of the arm and leg sections 13h and 13i is an annular header 31, FIG. 5, of the suit 13 which communicates with the upper and lower arm sections 13h and 13i via one-way check valves 20 which enable gas flow into the header 31, but close similarly to the other one-way valves 20 to prevent a reverse flow from header 31 into the sections 13h and 13i. Each header 31 is provided with a manually operative pressure relief valve 32 freely movable within the opening of a rigid grommet 33 that defines a gas discharge port 34. The valve 32 has inner and outer enlargements that prevent its removal from the grommet 33. The inner enlargement is normally urged to the closed position by a small spring 35 and is also held by pressure at the closed position against the grommet 33 to close port 34 when the suit 13 is inflated.

When the cyclist desires to deflate the suit 13 rapidly, he merely pushes the outer enlargement of the valve 32 inwardly against the tension of spring 35 to the open position, thereby to unseat the inner enlargement from the grommet 33 and to allow gas flow through port 34 around the reduced central portion of the valve 32. A plurality of annularly arranged and spaced inward projections 33a of the grommet 33 extend around the inner enlargement of the valve 32 to adjacent its inner surface in the open position, so that as air is allowed to escape from the suit 13 and the latter collapses, the portion of the header 31 opposite the valve 32 will not collapse against the inside of the valve 32 and block the escape of the remaining air in the suit 13 through port 34. Thus the suit may be evacuated essentially completely. Also the valves 32 are preferably located at the insides of the wrists where the valves 32 are readily accessible to be pushed to their open positions by the wearer of the suit when the latter is inflated.

In order to adapt the suit 13 for "second crash" protection, it is desirable that the suit remain inflated at least for a number of seconds after inflation, although substantial deflation within less than a minute without recourse to the manually operated valves 32 may be desired. Approximately 50 percent deflation in about 20 seconds will usually be adequate. Thus the suit 13 may comprise a tightly woven flexible fabric that will slowly bleed to the atmosphere the gas with which it is inflated, thereby to accomplish the desired slow rate of deflation. If desired, the suit 13 may be fabricated from flexible sheet material or a coated fabric that is substantially impervious to gas leakage when inflated. In that case each valve 32 may be provided with a bleed slit 36 to effect the desired rate of automatic deflation even when the valves 32 are in their closed positions.

A preferred coupling 25a, b comprises a rigid tubular member 38 of circular cross section having a reduced end portion 40 suitably bonded to the hose 24. Adjacent the opposite end of member 38 is an outwardly opening annular groove or channel 41 having diverging channel sides adapted to receive radially inner portions of a plurality of identical steel balls 42 equally spaced circumferentially around the axis of the member 38. Endwise of the groove 41 is a reduced pilot portion 43 of the member 38 removably insertable into an annular bore enlargement 44 of a rigid tubular member 45 of coupling 25b, also of circular cross section and having a reduced end 47 bonded to the hose 26.

The bore enlargement 44 enlarges again in the direction toward the balls 42 to provide an annular seat engageable at a fluid tight seal 48 with a mating annular seat defined by an annular enlargement of 38 between the latter's groove 41 and reduced end 43, thereby to effect a fluid tight seal between the members 38 and 45 of the coupling 25a, b when these are assembled together as shown.

The balls 42 are contained and freely movable radially within a corresponding plurality of radial wells 49 in the member 45, each well 49 having a circular inner opening into the groove 41 of a diameter slightly less than the diameter of the associated ball 42. Outwardly, each well 49 opens radially through a cylindrical outer surface 50 of the member 45, which also provides a radial enlargement or annular spring retaining shoulder 51 spaced leftward in FIG. 3 from the annularly arranged wells 49. An annular sleeve 52 axially slidable on member 45 has a radially inwardly projecting annular land 53 adapted to overlie the balls 42 and hold them radially inward at the positions shown with their radially inner portions projecting into the groove 41. A second radially inwardly projecting annular land 54 of sleeve 52 is spaced rightward of the land 53 to provide an annular ball receiving groove 55 between the lands 53 and 54 and is normally urged rightward in FIG. 3 by a spring 56 against a split ring retainer 57. The latter is releasably confined within an annular groove in the outer cylindrical surface of member 45 adjacent the latter's right end. The spring 56 is confined under compression between shoulder 51 and land 53. The sleeve 52 is rigidly secured to a bracket 58 which in turn is pivotally secured by a flanged pin 59 to a sturdy portion 60 of the motorcycle 9, whereby the entire coupling 25a, b can readily pivot about the vertical axis of the pin 59.

It is apparent from the structure described that the spring 56 reacts against the shoulder 51 to move member 45 leftward with respect to sleeve 52, which is fixed with respect to the motorcycle 9 except for pivotal movement about pin 59. Thus the right sidewalls of the wells 49 urge the balls 42 leftward against the left wall of the groove 41, thereby to maintain the fluid sealing engagement at 48 between members 38 and 45. The coupling members 38 and 45 are thus locked together and cannot be pulled apart as long as land 53 overlies the balls 42.

In the event of an emergency and the cyclist is thrown forward or to one side or the other from the motorcycle, the coupling 25a, b will swing around the axis of the pin 59 to maintain the axis of the sleeve 52 aligned with the direction of the pull exerted by hose 24, whereby the member 38 will pull the balls 42 and member 45 against the force of spring 56 until the balls 42 move clear of land 53 and are released into space 55. The radially inner ends of the balls 42 will then clear the left wall of groove 41 in FIG. 3 and enable member 38 to be pulled loose from member 45 and travel with the rider free of the motorcycle. The movement of the balls 42 into the space 55 is facilitated by the cam action of the diverging walls of groove 41. Also during the coupling release movement, the lands 53 and 54 slide along the juxtaposed outer cylindrical surfaces of member 45 in guided relationship and the outer cylindrical surface 61 similarly slides along the inner cylindrical surface of sleeve 52.

When the gas source 27 is triggered as aforesaid to release pressurized gas into hose 26, either by manual operation of the trigger 29 or by a predetermined deceleration of the motorcycle, the released gas will flow into header 13d as described and then via the various one-way valves 20 into the inflatable sections 13a, b, c, f, g, h, i, and k to completely inflate the suit 13 in not more than a few hundredths of a second. If the rider subsequently jumps or is thrown from the motorcycle, his weight will pull the coupling part 25a from the coupling part 25b as described; valve 21 will prevent immediate deflation of the suit 13; and the cyclist will be free of both the motorcycle and the gas supply means.

In the event there is no accident and the rider desires to dismount from the motorcycle while wearing the uninflated suit 13, he merely disconnects the coupling parts 25a and 25b by pulling the hose 24 and attached member 38 rightward with respect to sleeve 52 (which is secured at 59 to the motorcycle) and then carries the short hose portion 24 and attached coupling part 25a with him. When he returns to the motorcycle, he merely reconnects the coupling 25a, 25b to assure protection in the event of an accident. The reconnection is accomplished by pushing member 45 leftward with respect to the sleeve 52 until the annular opening 55 overlies the balls 42. Simultaneously member 38 is inserted leftward into the open right end of tubular member 45 until the coupling members 38 and 45 engage and seal at 48. Member 45 is then released while the rightward force on member 38 is maintained until the land 53 cams the balls 42 into groove 41 and overlies them as shown in FIG. 3.

Having thus described our invention, we claim:

1. In a crash protection device for a rider who jumps or is thrown from a vehicle having a source of pressurized gas actuatable to release said gas in anticipation of predetermined deceleration of the vehicle, an inflatable garment adapted to be worn by the rider, hose means for connecting at one end with said source of gas, connecting means carried by said garment for releasably connecting the other end of said hose means with said garment to inflate the latter upon release of said gas from said source and being releasable from said other end by the pull of the garment thereon when the rider wearing said suit falls from the motorcycle, and one-way valve means cooperable with said connecting means to enable inflation of said garment by the gas from said source and to prevent escape of said gas from said garment via said connecting means.

2. In a device according to claim 1, said connecting means comprising a length of flexible hose secured at one end to said garment and having a first coupling member at its opposite end, said hose means having a second coupling member at said other end thereof for releasably coupling with said first coupling member, and means for pivotally connecting said second coupling member to said motorcycle for aligning said second coupling member with the direction of said pull.

3. In a device according to claim 2, said garment having inflatable arm and leg sections, and manually operative valve means adjacent the extremity of at least one of said sections for rapidly deflating said garment.

4. In a device according to claim 2, said coupling members having interlockable means movable between locking and unlocking positions for interlocking said members together and for releasing the same for separation from each other, and resilient means normally holding said interlockable means in the locking position when said members are coupled and being yieldable to the force of said pull for enabling movement of said interlockable means to the unlocking position.

5. In a device according to claim 1, said vehicle having a steering mechanism with a handgrip portion, and manually actuatable trigger means for selectively actuating said source to release said gas and mounted on said vehicle adjacent said handgrip portion.

6. In a device according to claim 5, said vehicle having a motorcycle type handle bar steering mechanism with said handgrip portions, and said trigger means being mounted on said handlebar adjacent one of said handgrip portions.

7. In a device according to claim 1, means for slowly dissipating gas from said garment to deflate the same approximately 50 percent from a fully inflated condition in a time interval amounting to more than several seconds and less than a minute.

8. In a device according to claim 1, said garment having a non-inflatable portion at the buttocks region comprising a shock absorbing cushion.

9. In a device according to claim 1, an exhaust port in said garment, valve means normally closing said exhaust port and manually operable for selectively opening the latter valve for deflating said garment, and means cooperable with the latter valve means to prevent said garment from closing said exhaust port during deflation of said garment comprising spacer means for spacing said garment from said exhaust port.

10. In a device according to claim 1, said garment having inflatable body and arm sections, said arm sections being inflatable to a lesser extent than said body section to facilitate movement of the inflated arm sections by said rider.

* * * * *